United States Patent [19]
Myles, III et al.

[11] Patent Number: 5,540,217
[45] Date of Patent: Jul. 30, 1996

[54] SOLAR ENERGY CONCENTRATING SYSTEM HAVING REPLACEABLE REFLECTORS

[76] Inventors: John F. Myles, III, Rte. 3 Box 200, Pittsboro, N.C. 27312; Michael H. Nicklas, 1237 Gatehouse Dr., Cary, N.C. 27511; Louis J. Gerics, 804 Sasser St., Raleigh, N.C. 27604

[21] Appl. No.: 379,844

[22] Filed: Jan. 26, 1995

[51] Int. Cl.⁶ .................................................. F24J 2/10
[52] U.S. Cl. .......................... 126/692; 126/621; 126/684; 126/693; 126/694; 126/695; 126/696
[58] Field of Search ..................... 126/684, 621, 126/623, 622, 628, 629, 651, 657, 692–694, 695, 684, 600, 696

[56] References Cited

U.S. PATENT DOCUMENTS

| | | | |
|---|---|---|---|
| 2,625,930 | 1/1953 | Harris | 126/621 X |
| 3,868,823 | 3/1975 | Russell, Jr. et al. | 126/600 X |
| 4,149,523 | 4/1979 | Bay-Marcotte et al. | 126/589 |
| 4,291,679 | 9/1981 | Kersavage | 126/621 |
| 4,309,984 | 1/1982 | Darbeck | 126/599 |
| 4,579,106 | 4/1986 | Townsend et al. | 126/621 X |
| 4,587,951 | 5/1986 | Townsend et al. | 126/621 X |
| 4,602,613 | 7/1986 | Barr | 126/600 |

Primary Examiner—Larry Jones
Attorney, Agent, or Firm—Brian D. Voyce

[57] ABSTRACT

The present invention relates to an improved solar energy concentrating system incorporating replaceable solar energy concentrating reflectors. Prior systems typically required a structurally stable solar energy concentrating panel. The present invention uses a combination of structurally stable backing panels and flexible solar energy concentrating reflectors to significantly reduce the ease and cost of replacing reflectors.

24 Claims, 2 Drawing Sheets

SOLAR ENERGY CONCENTRATING SYSTEM HAVING REPLACEABLE REFLECTORS

TECHNICAL FIELD

The present invention relates to an improved solar energy concentrating system incorporating replaceable solar energy concentrating reflectors. Prior systems typically required a structurally stable solar energy concentrating panel. The present invention uses a combination of structurally stable backing panels and flexible solar energy concentrating reflectors to reduce significantly the ease and cost of replacing reflectors.

BACKGROUND ART

In the past, solar energy concentrating systems used solar energy concentrating reflectors that were structurally stable. However, with time, the reflector surfaces suffered a degradation of reflectivity from attack by the weather. Prior systems required the user to replace the entire reflector. Typically, these panels were heavy and expensive.

SUMMARY OF THE INVENTION

The present invention relates to an improved solar energy concentrating system incorporating replaceable solar energy concentrating reflectors. Prior systems typically required a structurally stable solar energy concentrating panel. The present invention uses a combination of structurally stable backing panels and flexible solar energy concentrating reflectors to reduce significantly the ease and cost of replacing arcuate reflectors. (For the purposes of the present invention, arcuate can refer to either cylindrically arcuate shapes, anticlastically arcuate shapes or parabolically arcuate shapes.)

In a single panel application, a moveable-collector, solar energy concentrating system comprises the following elements. A reflector backing panel has a concave and arcuate configuration of up to 180 degrees, a lower edge, an upper edge, and curved lateral edges. (For the, purposes of this invention, "lower" and "upper" do not express, necessarily, a relative position between the edges, for example, if the reflector backing panel has a 180 degree configuration, then these edges may be equidistant from the supporting surface for the reflector.) The skyward surface of the reflector backing panel is the concave surface. The reflector backing panel is dimensioned and configured so as to provide configurational stability to an overlying solar energy concentrating reflector. One of ordinary skill in the art can use various materials to construct a structurally stable reflector backing panel, including fabricated metals or alloys, and molded laminates or composites.

A structural support means extends beneath the reflector backing panel, being dimensioned and configured so as to support at least the weight of the reflector backing panel, a solar energy collector, a solar energy concentrating reflector, and a solar energy collector support means. A typical example of a suitable means is a truss such as a space truss, but others are known to those of ordinary skill in the art. The reflector backing panel is connected to the structural support means so as to maintain the proper orientation to the sky.

On top of the reflector backing panel lies a flexible solar energy concentrating reflector. (For the purposes of this invention, "flexible" includes describing a surface or object that does not maintain a desired arcuate configuration to within several degrees of arc when unsupported.) The reflector has an upper edge, a lower edge, and curved lateral edges. The reflector has a concave and arcuate configuration complementary to that of the reflector backing panel. Either the skyward surface is highly reflective or the reflector is transparent and the lower surface of the reflector is highly reflective with respect to incoming radiant solar energy. The reflector can be attached to the reflector backing panel by conventional fastening means. By not requiring an arcuately stable design, one can significantly lower the cost of fabricating the reflector. Also, by making the solar reflector flexible, one significantly reduces its weight, making it much easier to transport and physically replace the reflector.

A collector support means is connected to an underlying element such as the reflector backing panel, the structural support means, or a surface underlying the structural support means. The collector support means is disposed above the reflector so as to support a reflected solar energy collector in a predetermined focal zone for collecting the reflected solar energy. In the case of a moveable collector system, such as one using cylindrically arcuate reflectors, the collector support means also allows the collector to move arcuately within the predetermined focal zone. The nature and size of a focal collection zone depends upon the shape of the reflector and the shape of the collector, as is known to those of ordinary skill in the art.

In order to gather the reflected solar energy, a solar energy collector extends lengthwise above and across the curved lateral edges of the reflector. The collector is dimensioned and configured so as to receive the reflected solar energy into a conduit through which an energy transfer fluid can flow, the fluid being heated by the reflected solar energy.

Other conventional elements include a means for positioning the collector in an optimal position for collecting the reflected solar energy throughout a defined solar cycle. (For example, typically the solar cycle is the diurnal cycle.) The positioning means is connected to the collector support means. One of ordinary skill in the art can appreciate that the positioning means can be of various embodiments, e.g., hydraulic, mechanical, or electrical.

Finally, a fluid transport system connects the conduit of the collector to a thermal energy means such as a thermal energy use means or an energy storage means. The fluid transport means circulates the solar-heated fluid through the conduit.

The present invention is particularly suitable to multiple arrays, or rows of reflectors. In such an arrangement, a plurality of reflectors and a plurality of underlying reflector backing panels are used, as described above. If used in a row, the curved lateral edges of each reflector or each reflector backing panel are dimensioned and configured such that the curved lateral edge of a reflector or a reflector backing panel can be placed adjacent to the curved lateral edge of another reflector or reflector backing panel, so as to form a row of reflector backing panels with reflectors on top.

The present improvement is also suitable for use in stationary collector applications. Conventional stationary collector systems have a positioning means and a fluid transport system as described above. However, the collector support means is dimensioned and configured to hold the collector in a stationary position. Meanwhile, the structural support means is disposed below or above the reflector so as to support the reflector in a predetermined focal zone for collecting the reflected solar energy from the collector. With the present improvement, instead of requiring the replacement of a moveable reflector, one uses a combination of the flexible reflector and a rigid reflector backing panel.

PREFERRED EMBODIMENTS

Figure 1:
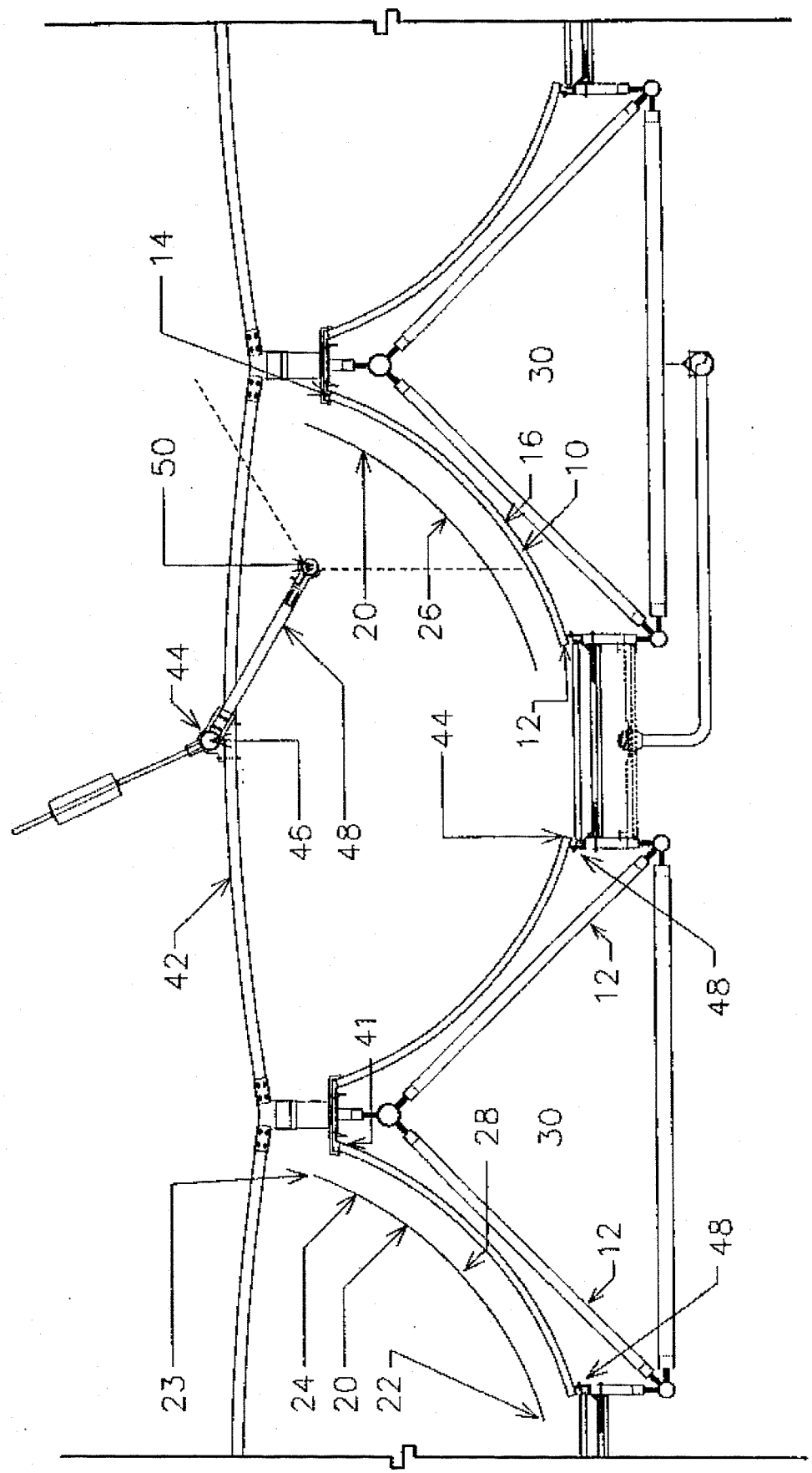
FIG. 1 is a sectional view of the present invention.
Figure 2:
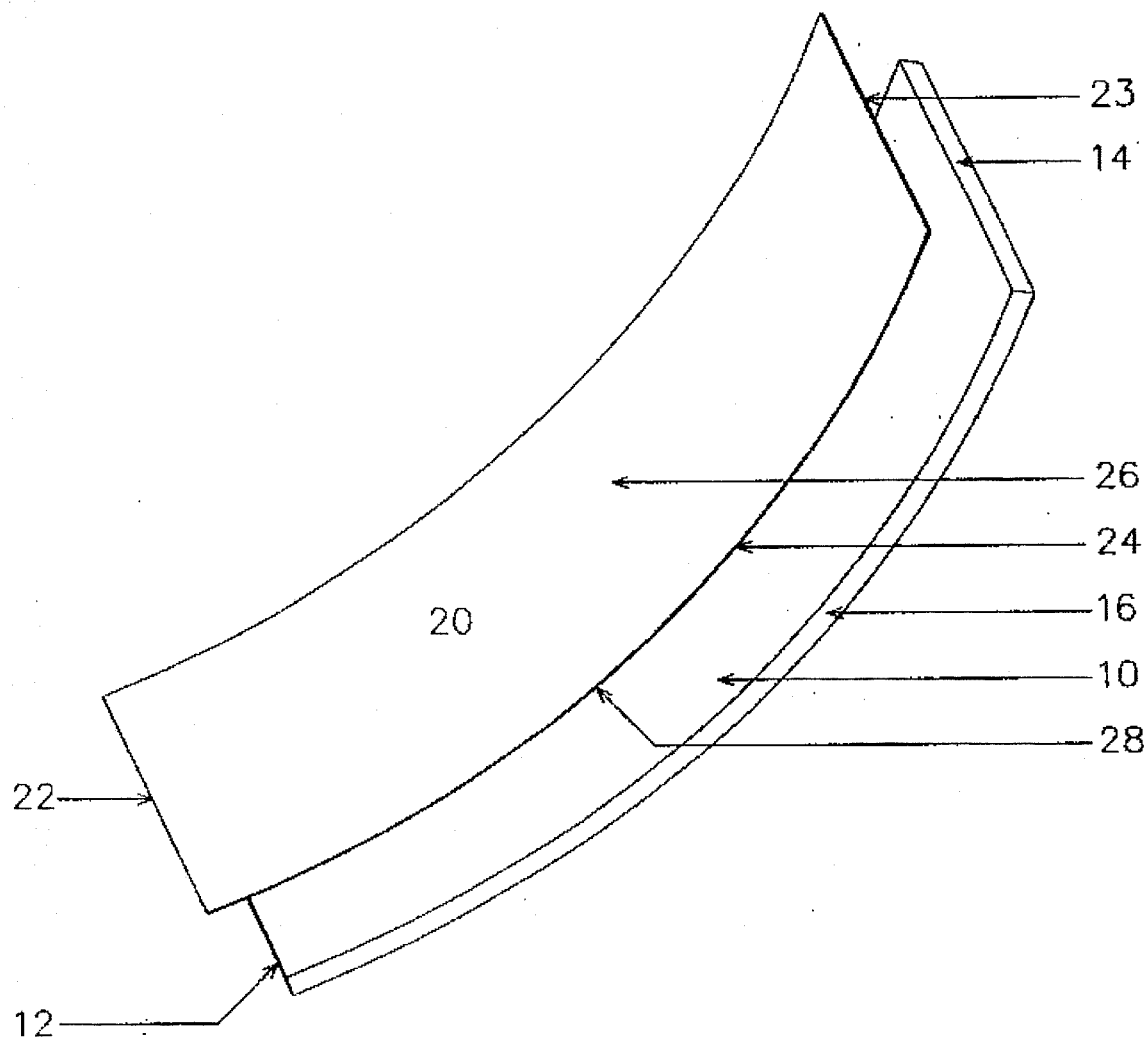
FIG. 2 is an isometric view of the present invention.

A preferred embodiment of the present invention is shown in FIG. 1. The illustrated embodiment is for a moveable collector system having a cylindrically arcuate stationary reflector. A reflector backing panel (10) underlies a solar energy concentrating reflector (20). The reflector backing panel has a substantially rigid concave and arcuate configuration of up to 180 degrees. The reflector backing panel has a lower edge (12), an upper edge (14), and two curved lateral edges (16). In addition,, the reflector backing panel is dimensioned and configured so as to provide dimensional or configurational stability to the overlying reflector. Suitable fabrications of the reflector backing panel include formed aluminum or molded composites such as UV resistant reinforced fiberglass.

The flexible reflector (20) can assume a concave and cylindrically arcuate configuration of up to 180 degrees. Yet, the reflector can be flexible enough to lie flat when unsupported. If releasably attached to the reflector backing panel by conventional fastening means, then the reflector assumes a shape complementary to the reflector backing panel. The reflector has a lower edge (22), an upper edge (23), and curved lateral edges (24). The skyward surface (26) of the reflector is the concave surface. Such a panel can be comprised of transparent, ultraviolet-stabilized acrylic, about 1.5 mm thick, and having powdered aluminum sputtered onto the lower surface (28) so as to create a reflectivity of at least 75%, preferably over 95%. FIG. 1 illustrates the reflector in an exploded view, the reflector suspended above the backing panel.

A structural support means, in this case a space truss (30), is disposed beneath the reflector backing panel and is connected thereto, serving as the structural support means. The space truss is dimensioned and configured to support the weight of at least the reflector, the reflector backing panel, a reflected solar energy collector (50) and a collector support means. A number of alternative structural configurations can be designed by those of ordinary skill in the art.

A collector support means spans across and above the reflector. As shown in FIG. 1, the collector support means comprises two arches (42), a bearing means (44) on each arch, a drive shaft member (46) connected to the bearing means so as to comprise a rotating means, and two lower support members (48). The collector support means is dimensioned and configured so to support the collector, and thus, alternative designs are known to those of ordinary skill in the art.

The reflected solar energy collector (50) extends laterally across the reflector from curved lateral edge (24) to curved lateral edge (24). With the cylindrically arcuate reflector backing panels shown, one could use a number of known collector configurations, but a more preferred collector would use the compound parabolic shape as disclosed in U.S. Pat. No. 5,274,974 to Winston. Thus, the collector is dimensioned and configured to receive reflected solar energy into an interior conduit through which a fluid can flow. The collector is connected to the arches (42) by the lower support members (48), which in turn, are connected to the drive shaft member (46), which in turn, is connected to the bearing means (44) disposed on each arch. Attachment points (41) for the arches in the collector support means are located adjacent to the upper edge of the reflector. Alternatively, the arches could have been connected directly to the structural means, such as a space truss or a supporting surface that underlies the structural means.

In the preferred embodiment for cylindrically arcuate reflector backing panels, the bearing means and drive shaft member are located at the center of curvature for the reflector. The lower support members (48) are dimensioned such that the solar energy collector is located downward from the center of curvature by a distance L plus or minus 5% according to the formula: $L=(R*1.1)/2$; where R equals the radius of the curvature of the reflector. The above arrangement of elements allows the collector to move arcuately within a predetermined focal zone for collecting the reflected solar energy from the reflector.

A means for positioning the collector, not shown, is connected to the drive shaft member (46). The positioning means can comprise any of a number of conventional means including a hydraulic motor driven by a hydraulic pump and control means, an electrical motor, or a mechanical chain/gear or cable/pulley means. In any of thence forms, the positioning means keeps the collector in an optimal position for collecting reflected solar energy within the focal collection zone throughout a defined solar cycle. (Preferably, the defined solar cycle is the diurnal solar cycle.) Thus, a microprocessor can be part of the positioning means, calculating periodically the optimal reflected solar energy gathering position according to an algorithm that takes into account the latitude, the time of year, and the time of day, such algorithms being known to those of ordinary skill in the art.

Finally, a conventional fluid transport system, not shown, connects the conduit of the collector to a thermal energy use means or an energy storage means. The fluid transport means circulates the solar energy-heated fluid through the conduit. Suitable energy transfer fluids are known to those of skill in the art, including distilled water, but more preferably for high temperature application, include silicone heat transfer fluid (HTF), organic synthetic HTF, or inhibited glycol HTF which can be used in a temperature range of from −100° F. to 350° F.

All publications or unpublished patent applications mentioned herein are hereby incorporated by reference thereto.

Other embodiments of the present invention are not presented here which are obvious to those of ordinary skill in the art, now or during the term of any patent issuing from this patent specification, and thus, are within the spirit and scope of the present invention.

We claim:

1. A solar energy concentrating reflector means comprising:

a) a reflector backing panel having a concave and arcuate configuration of up to 180 degrees, a lower edge, an upper edge, and curved lateral edges, and the skyward surface being the concave surface, said reflector backing panel being dimensioned and configured to be dimensionally and arcuately stable; and b) a solar energy concentrating reflector, being disposed or releasably attached to the reflector backing panel, and the skyward surface of the reflector being the concave surface, said reflector having a skyward facing surface that reflects radiant solar energy and being configured so as to need the support of the underlying reflector backing panel for arcuate stability.

2. The reflector means of claim 1 wherein the skyward surface of the solar energy concentrating reflector has a reflectivity index of at least 75%.

3. The reflector means of claim 1 wherein the reflector is comprised of a flexible transparent material having a reflectorized material deposited on the lower surface.

4. The reflector means of claim 1 comprising a plurality of reflector backing panels disposed laterally adjacent and a plurality of reflectors, wherein:
   a) each reflector backing panel is dimensioned and configured along the curved lateral edges wherein the curved lateral edge of a reflector backing panel can be placed along the curved lateral edge of another reflector backing panel so as to form a row of adjacent reflector backing panels; and
   b) each reflector is dimensioned and configured along the curved lateral edges wherein the curved lateral edge of a reflector can be placed along the curved lateral edge of another reflector so as to form a row of adjacent reflector backing panels.

5. A solar energy concentrating system comprising:
   a) a reflector backing panel having a concave and arcuate configuration of up to 180 degrees, a lower edge, an upper edge, and curved lateral edges, and the skyward surface being the concave surface, said reflector backing panel being dimensioned and configured to be dimensionally and arcuately stable;
   b) a solar energy concentrating reflector, being disposed or releasably attached to the reflector backing panel, and the skyward surface of the reflector being the concave surface, said reflector having a skyward facing surface that reflects radiant solar energy and being configured so as to need the support of the underlying reflector backing panel for arcuate stability;
   c) a structural support means extending beneath the reflector backing panel and being connected thereto, said structural support means being dimensioned and configured so as to support the weight of the reflector, the reflector backing panel, a reflected solar energy collector, and a collector support means;
   d) a reflected solar energy collector extending lengthwise across the curved lateral edges of the reflector, said collector being located and disposed so as to move within a predetermined focal zone for collecting the reflected solar energy from the reflector, and said collector being dimensioned and configured so as to receive the reflected solar energy into a conduit through which an energy transfer fluid can flow, said fluid being heated by the reflected solar energy;
   e) a collector support means which supports said collector in the focal collection zone and is connected to an underlying element;
   f) a means for positioning the collector in an optimal position within the focal collection zone for collecting reflected solar energy throughout a defined solar cycle, said positioning means being connected to the collector support means; and
   g) a fluid transport system which connects the conduit to a thermal energy means, wherein the fluid transport means circulates the solar-heated fluid through the conduit.

6. The solar energy concentrating system of claim 5 wherein the defined solar cycle is the diurnal solar cycle.

7. The solar energy concentrating system of claim 5 wherein the structural support means extends both laterally and lengthwise underneath the reflector backing panel so as to be connected to the upper edge, the lower edge, and the curved lateral edges of the reflector backing panel.

8. The solar energy concentrating system of claim 5 wherein the skyward surface of the solar energy concentrating reflector has a reflectivity index of at least 75%.

9. The solar energy concentrating system of claim 5 wherein the reflector is comprised of a flexible transparent material having a reflectorized material deposited on the lower surface.

10. A solar energy concentrating system comprising:
    a) a plurality of reflector backing panels, each reflector backing panel having a concave and arcuate configuration of up to 180 degrees, a lower edge, an upper edge, and curved lateral edges, each reflector backing panel being dimensioned and configured along the curved lateral edges wherein the curved lateral edge of a reflector backing panel can be placed along the curved lateral edge of another reflector backing panel so as to form a row of adjacent reflector backing panels, and the skyward surface being the concave surface, and each reflector backing panel being dimensioned and configured to be dimensionally and arcuately stable;
    b) a plurality of solar energy concentrating reflectors, each reflector being disposed or releaseably attached to an underlying reflector backing panel so as to form a row of adjacent reflectors, and the skyward surface of each reflector being the concave surface, each reflector having a skyward facing surface that reflects radiant solar energy and being configured so as to need the support of the underlying reflector backing panel for arcuate stability;
    c) a structural support means extending beneath the row of reflector backing panels and being connected to at least one of the reflector backing panels, said structural support means being dimensioned and configured so as to support the weight of the reflectors, the reflector backing panels, a reflected solar energy collector, and a collector support means;
    d) a reflected solar energy collector extending lengthwise across the lateral edges of the row of reflectors, said collector being located and disposed so as to move within a predetermined focal zone for collecting the reflected solar energy from the reflectors, and said collector being dimensioned and configured so as to receive the reflected solar energy into a conduit through which an energy transfer fluid can flow, said fluid being heated by the reflected solar energy;
    e) a collector support means which supports said collector in the focal collection zone and is connected to an underlying element;
    f) a meaning for positioning the collector in an optimal position within the focal collection zone for collecting reflected solar energy throughout a defined solar cycle, said positioning means being connected to the collector support means; and
    g) a fluid transport system which connects the conduit to a thermal energy means, wherein the fluid transport means circulates the solar-heated fluid through the conduit.

11. The solar energy concentrating system of claim 10 wherein the defined solar cycle is the diurnal solar cycle.

12. The solar energy concentrating system of claim 10 wherein the structural support means extends both laterally and lengthwise underneath the reflector backing panels so as to be connected to the upper edge, the lower edge, and the curved lateral edges of at least one of the reflector backing panels to which the structural support means is connected.

13. The solar energy concentrating system of claim 10 wherein the skyward surface of each solar energy concentrating reflector has a reflectivity index of at least 75%.

14. The solar energy concentrating system of claim 10 wherein each reflector is comprised of a flexible transparent material having a reflectorized material deposited on the lower surface.

15. A solar energy concentrating system comprising:
    a) a plurality of reflector backing panel, each reflector backing panel having a concave and arcuate configuration of up to 180 degrees, a lower edge, an upper edge, and curved lateral edges, each reflector backing panel being dimensioned and configured along the curved lateral edges wherein the curved lateral edge of a reflector backing panel can be placed along the curved lateral edge of another reflector backing panel so as to form a row of adjacent reflector backing panels, and the skyward surface of each reflector backing panel being the concave surface, each reflector backing panel being dimensioned and configured to be dimensionally and arcuately stable;

b) a plurality of solar energy concentrating reflectors, each reflector being disposed or releaseably attached to an underlying reflector backing panel so as to form a row of adjacent reflectors, and the skyward surface of each reflector being the concave surface, each reflector having a skyward facing surface that reflects radiant solar energy and being configured so as to need the support of the underlying reflector backing panel for arcuate stability;

c) a structural support means connected to the row of reflector backing panels, said structural support means being dimensioned and configured so as to support at least the row of reflector backing panels and the attached reflectors beneath a stationary reflected solar energy collector, the structural support means being dimensioned and configured to move the reflector about the collector such that the collector stays disposed in a predetermined focal zone for collecting the reflected solar energy from the reflector, and is connected to either a collector support means or a surface underlying the collector support means, d) a stationary reflected solar energy collector extending lengthwise across and above the curved lateral edges of the reflectors, said collector being located and disposed so as to be within the focal collection zone, said collector being dimensioned and configured so as to receive the reflected solar energy into a conduit through which an energy transfer fluid can flow, said fluid being heated by the reflected solar energy;

e) a collector support means which supports the collector above the reflectors and is connected to an underlying element, said collector support means being dimensioned and configured so as to support the weight of at least the collector;

f) a means for positioning the reflector such that the collector is in an optimal position within the focal collection zone for collecting reflected solar energy throughout a defined solar cycle, said positioning means being connected to the structural support means; and g) a fluid transport system which connects the conduit to a thermal energy means, wherein the fluid transport means circulates the solar-heated fluid through the conduit.

16. The solar energy concentrating system of claim 15 wherein the defined solar cycle is the diurnal solar cycle.

17. The solar energy concentrating system of claim 15 wherein the structural support means extends both laterally and lengthwise underneath the reflector backing panels so as to be connected to the upper edge, the lower edge, and the curved lateral edges of at least one of the reflector backing panels.

18. The solar energy concentrating system of claim 15 wherein the skyward surface of each solar energy concentrating reflector has a reflectivity index of at least 75%.

19. The solar energy concentrating system of claim 15 wherein each reflector is comprised of a flexible transparent material having a reflectorized material deposited on the lower surface.

20. An improved solar energy concentrating system comprising:

a) a reflector backing panel having a concave and arcuate configuration of up to 180 degrees, a lower edge, an upper edge, and curved lateral edges, and the skyward surface being the concave surface, said reflector backing panel being dimensioned and configured to be dimensionally and arcuately stable;

b) a solar energy concentrating reflector, being disposed or releaseably attached to the reflector backing panel, and the skyward surface of the reflector being the concave surface, said reflector having a skyward facing surface that reflects radiant solar energy and being configured so as to need the support of the underlying reflector backing panel for arcuate stability;

c) a structural support means connected to the reflector backing panel, said structural support means being dimensioned and configured so as to support at least the reflector backing panel and the attached reflector beneath a stationary reflected solar energy collector, the structural support means being dimensioned and configured to move the reflector about the collector such that the collector stays disposed in a predetermined focal zone for collecting the reflected solar energy from the reflector, and is connected to either a collector support means or a surface underlying the collector support means, d) a stationary reflected solar energy collector extending lengthwise across and above the curved lateral edges of the reflector, said collector being located and disposed so as to be within the focal collection zone, said collector being dimensioned and configured so as to receive the reflected solar energy into a conduit through which an energy transfer fluid can flow, said fluid being heated by the reflected solar energy;

e) a collector support means which supports the collector above the reflector and is connected to an underlying element, said collector support means being dimensioned and configured so as to support the weight of at least the collector;

f) a means for positioning the reflector such that the collector is in an optimal position within the focal collection zone for collecting reflected solar energy throughout a defined solar cycle, said positioning means being connected to the structural support means; and g) a fluid transport system which connects the conduit to a thermal energy means, wherein the fluid transport means circulates the solar-heated fluid through the conduit.

21. The solar energy concentrating system of claim 20 wherein the defined solar cycle is the diurnal solar cycle.

22. The solar energy concentrating system of claim 20 wherein the structural support means extends both laterally and lengthwise underneath the reflector backing panel so as to be connected to the upper edge, the lower edge, and the curved lateral edges of the reflector backing panel.

23. The solar energy concentrating system of claim 20 wherein the skyward surface of the solar energy concentrating reflector has a reflectivity index of at least 75%.

24. The solar energy concentrating system of claim 20 wherein the reflector is comprised of a flexible transparent material having a reflectorized material deposited on the lower surface.

* * * * *